(12) United States Patent
Tajima et al.

(10) Patent No.: US 7,478,933 B2
(45) Date of Patent: *Jan. 20, 2009

(54) VEHICLE LAMP (75) Inventors: Keiichi Tajima, Shizuoka (JP); Yuji Sugiyama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 11/438,379

(22) Filed: May 22, 2006

(65) Prior Publication Data

US 2006/0291230 A1  Dec. 28, 2006

(30) Foreign Application Priority Data

Jun. 8, 2005  (JP) ............ P.2005-168481

(51) Int. Cl.
*F21V 17/02* (2006.01)

(52) U.S. Cl. .................. 362/512; 362/505; 362/507; 362/509; 362/513; 362/539

(58) Field of Classification Search ............... 362/505, 362/507, 508, 509, 512, 513, 523, 351, 539

See application file for complete search history.

(56) References Cited

U.S. PATENT DOCUMENTS

| 4,700,172 A * | 10/1987 | Ishida et al. ................ 340/458 |
| 6,217,237 B1 * | 4/2001 | Ue et al. ...................... 396/440 |
| 2003/0058656 A1 * | 3/2003 | Yamaguchi ................. 362/547 |
| 2003/0072164 A1 * | 4/2003 | Watanabe et al. ........... 362/465 |
| 2005/0201117 A1 * | 9/2005 | Sugimoto et al. ........... 362/539 |

FOREIGN PATENT DOCUMENTS

| JP | 09-330603 | 12/1997 |
| JP | 2003-257218 | 9/2003 |
| JP | 2004-227933 | 8/2004 |

* cited by examiner

*Primary Examiner*—Sharon E Payne
*Assistant Examiner*—Mary Zettl
(74) *Attorney, Agent, or Firm*—Fish & Richardson P.C.

(57) ABSTRACT

A vehicle lamp is provided with: a lamp unit 10 supported horizontally rotationally movably within a lamp housing; a shade movable in a predetermined direction so as to change a shielded quantity of light emitted from a light source; a horizontally driving device for horizontally rotationally moving the lamp unit; and a shade driving device for moving the shade in the predetermined direction. The shade driving device is provided with a driving shaft to be coupled with the shade. The lamp unit is rotationally moved by the horizontally driving device around the driving shaft.

10 Claims, 6 Drawing Sheets

VEHICLE LAMP

The present application claims foreign priority based on Japanese Patent Application No. P.2005-168481, filed on Jun. 8, 2005, the contents of which are incorporated herein by reference.

BACKGROUND OF THE INVENTION

1. Field of the Invention

The present invention relates to a vehicle lamp. More specifically, the present invention relates to a technical field for downsizing a vehicle lamp by agreement in output positions between a horizontally driving device for horizontally rotating a lamp unit and a shade driving device for moving a shade.

2. Related Art

Some vehicle lamps have a "two-lamp switching mechanism" capable of switching between a lower beam (a passing beam) and an upper beam (a driving beam) by controlling a shielded quantity of light emitted from a light source and reflected on a reflector by moving the shade.

In the vehicle lamps, the shade, provided within a lamp unit arranged within a lamp housing, is inclinedly or vertically moved by driving force of a shade driving actuator serving as a shade driving device having a solenoid so that the shade position is changed, thereby controlling the shielded quantity of light. (For example, refer to JP-A-2003-257218 and JP-A-09-330603.)

On the other hand, there are some vehicle lamps capable of changing the illuminating direction according to the running status of a vehicle.

In these vehicle lamps, for example, the lamp unit having a light source is horizontally rotationally movably supported within a lamp housing. The lamp unit is rotationally moved by the driving force of a horizontally driving actuator serving as a horizontally driving device in a direction horizontal to the lamp housing, thereby changing the illuminating direction (for example, refer to JP-A-2004-227933).

Therefore, by rotationally moving the lamp unit by the driving force of the horizontally driving actuator, for example, where the vehicle runs on a meandering road or curves at a crossing, an illuminating direction is changed right and left according to a vehicle running direction so that the road in the vehicle running direction can be illuminated immediately.

Meanwhile, there are some vehicle lamps capable of switching between the lower beam and the upper beam and also horizontally changing the illuminating direction. In these vehicle lamps, two actuators are required, inclusive of a shade driving actuator serving as a shade driving device and a horizontally driving actuator serving as a horizontally driving device.

In these vehicle lamps, for example, the shade driving actuator is arranged within the lamp unit whereas the horizontally driving actuator is arranged outside the lamp unit within the lamp housing.

However, since the shade driving actuator is arranged within the lamp unit, the object to be driven inclusive of the lamp unit horizontally driven by the horizontally driving actuator is correspondingly heavy so that great torque is required for the horizontally driving actuator. This will lead to upsizing of the horizontally driving actuator and an increase in power consumption.

Further, in horizontally rotationally moving the lamp unit, a connection cord connected to the shade driving actuator is displaced owing to its flexing with the rotational movement of the lamp unit. Thus, the space for arranging the connecting cord corresponding to the displacing range and any consideration for training the connecting cord are required. This may lead to upsizing of the vehicle lamp and an increase in the production cost.

SUMMARY OF THE INVENTION

One or more embodiments of the present invention provide a vehicle lamp so as to realize downsizing and reduction in power consumption.

In accordance with one or more embodiments of the present invention, a vehicle lamp is provided with: a lamp unit supported in a lamp housing and rotationally movable in a horizontal direction, the lamp unit having a light source; a shade supported in the lamp unit and movable in a predetermined direction so as to change a shielded quantity of light emitted from the light source; a horizontally driving device for rotationally actuating the lamp unit in the horizontal direction; a shade driving device for actuating the shade; and a driving shaft provided on the shade driving device and coupled with the shade, the lamp unit being rotationally moved by the horizontally driving device around the driving shaft.

Therefore, agreement in output positions can be made between a shade driving device and the horizontally driving device.

Moreover, when the lamp unit is horizontally rotationally moved by the horizontally driving device, the shade driving device is not rotationally moved integrally with the lamp unit. The object to be driven inclusive of the lamp unit horizontally driven by the horizontally driving actuator is not heavy, thereby reducing the torque of the horizontally driving actuator, and realizing downsizing of the horizontally driving actuator and a decrease in power consumption.

Further, in accordance with one or more embodiments of the present invention, the horizontally driving device and the shade driving device may be provided within a single case. This permits downsizing and space-saving of the vehicle lamp.

Further, in accordance with one or more embodiments of the present invention, the driving shaft may be axially moved so that the shade is moved in the predetermined direction. This permits simplifying of the structure of the shade driving device.

Further, in accordance with one or more embodiments of the present invention, a DC motor may be used as a driving source for the shade driving device, and a rotation of a motor shaft of the DC motor may be converted into axial movement of the driving shaft so that the shade is moved in the predetermined direction. According to such a configuration, a large output can be obtained by small electric power, thereby realizing saving of the electric power and downsizing of the DC motor.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Each of exemplary embodiments described below is given when the vehicle lamp according to the present invention is applied to a projector type vehicle lamp, however, application of the present invention should not be limited to the projector-type vehicle lamp but may be a parabolic type of vehicle lamp.

First, explanation will be given to a first exemplary embodiment in which the vehicle lamp according to the present invention is applied to a vehicle headlamp (FIGS. 1 to 5).

Figure 1:
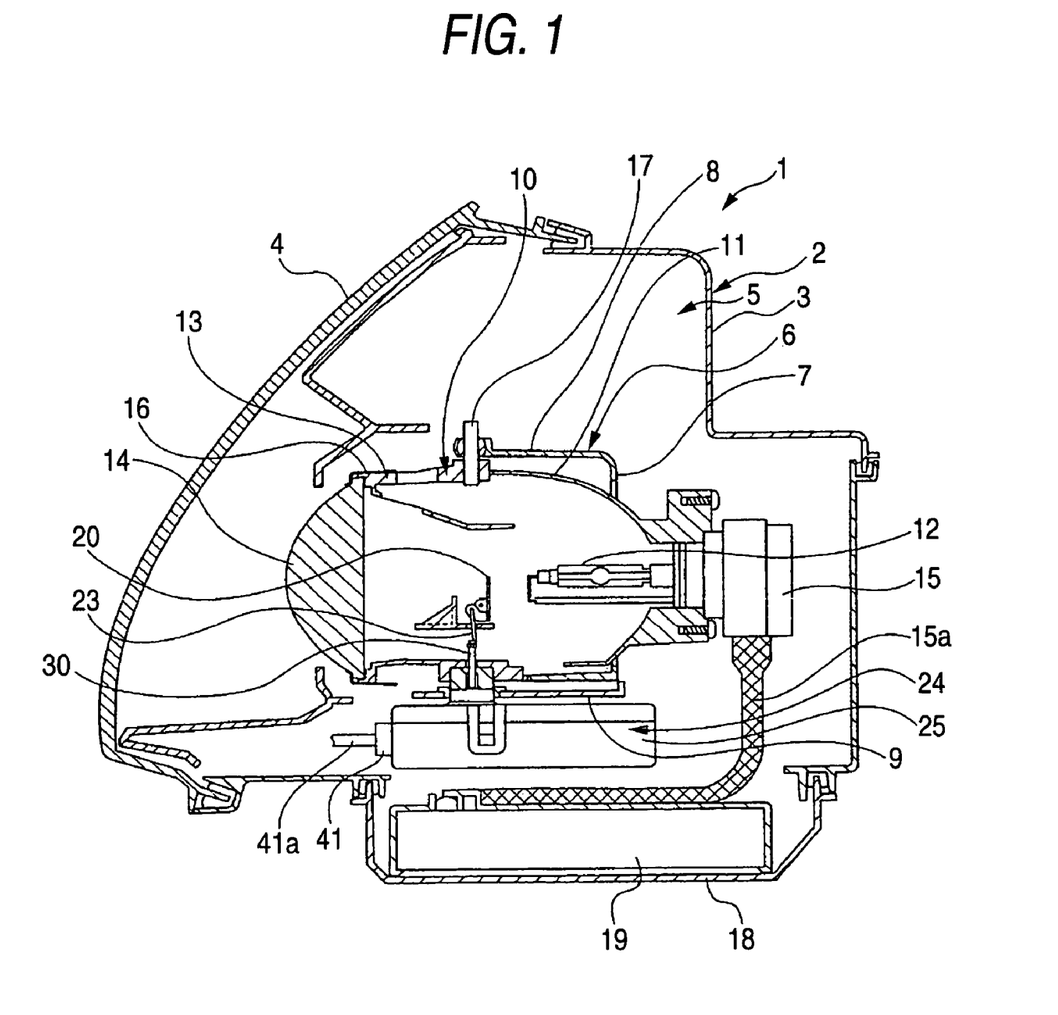
FIG. 1 is a schematic longitudinal sectional view of a vehicle lamp according to a first exemplary embodiment of the present invention.

A vehicle headlamp 1, as seen from FIG. 1, has a lamp housing 2 which includes a lamp body 3 having a convex segment opened forward and a transparent cover 4 closing a front opening of the lamp body 3. The internal space of the lamp housing 2 is formed as a lamp room 5.

Figure 2:
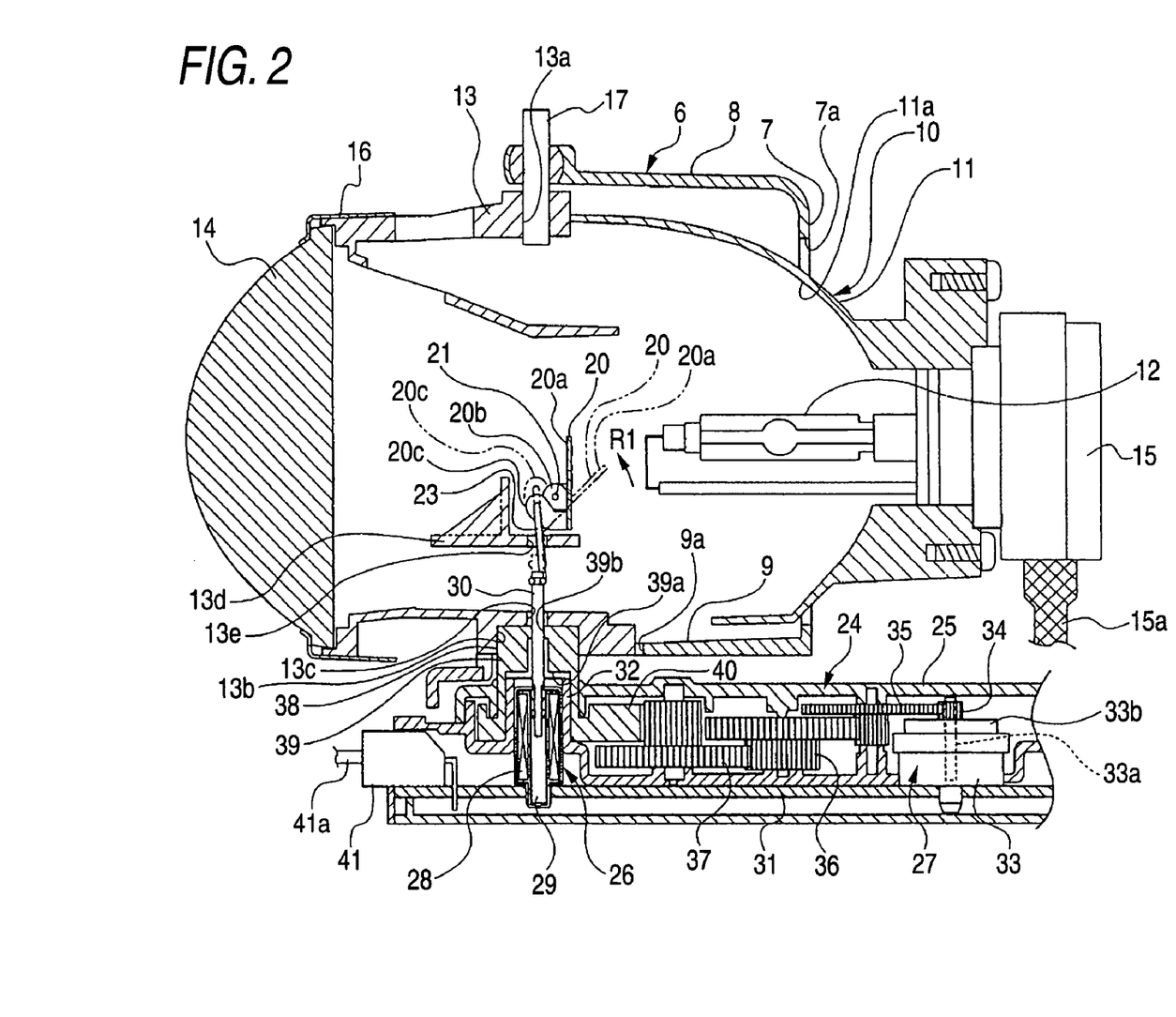
FIG. 2 is an enlarged longitudinal sectional view of a main part of the vehicle lamp.

Within the lamp room 5, a bracket 6 is arranged (FIGS. 1 and 2). The bracket 6 is composed of a base segment 7 oriented in a longitudinal direction, an upper supporting segment 8 protruding forward from the upper edge of the base segment 7 and a lower supporting segment 9 protruding forward from the lower edge of the base segment 7. The base segment 7 has a large opening 7a. The lower edge supporting segment 9 has a passing-through hole 9a formed near the tip.

Figure 3:
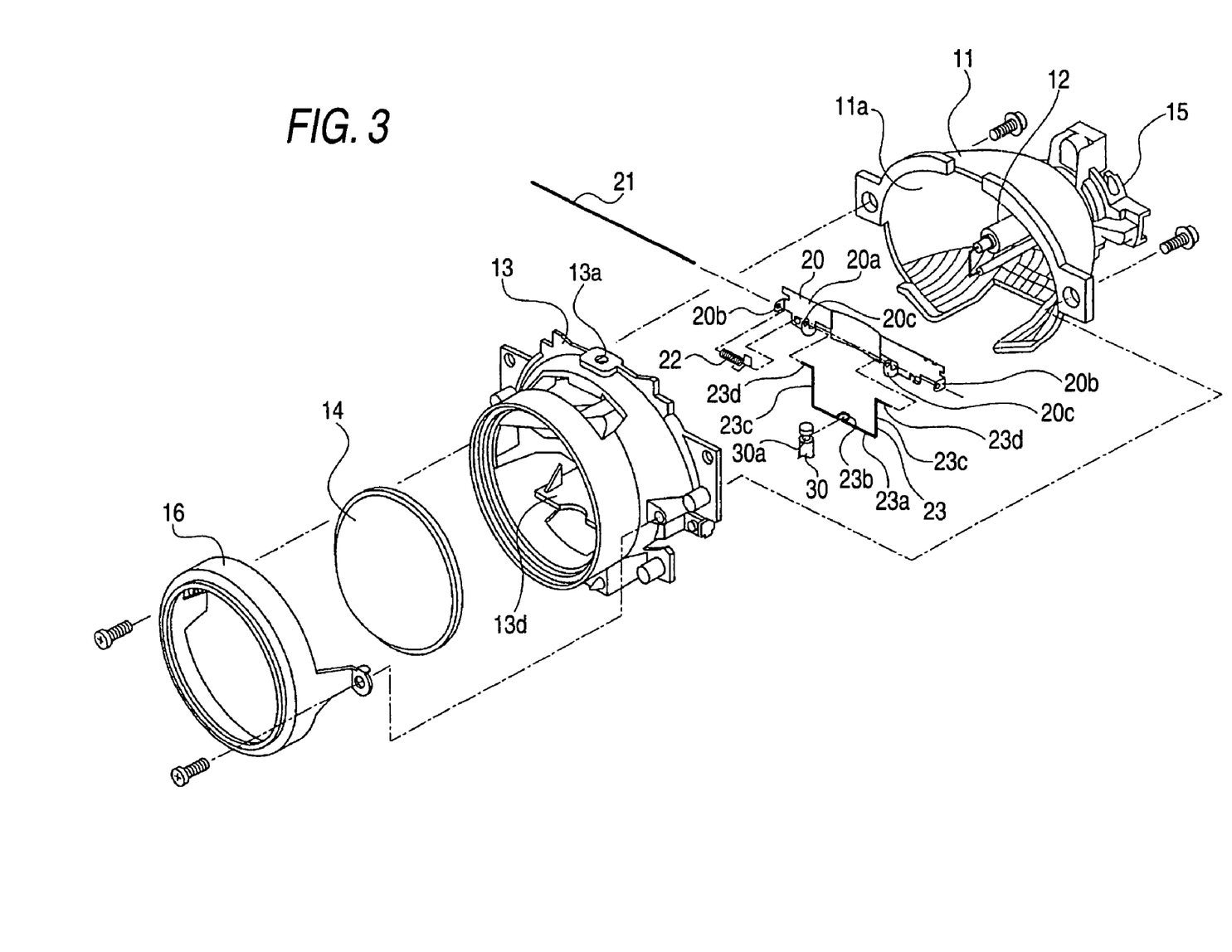
FIG. 3 is an exploded perspective view of the main part of the vehicle lamp.

A lamp unit 10 is supported horizontally rotationally movably to the bracket 6. The lamp unit 10, as seen from FIGS. 2 and 3, is composed of a concave reflector 11 opened forward, a light source bulb 12 for emitting illuminating light, a cylindrical attaching frame 13 attached to the front end of the reflector 11, and a floodlighting lens 14 which closes the front opening of the attaching frame 13.

The inner surface of the reflector 11 is formed as a reflecting surface 11a which serves to reflect the light emitted from the light source bulb 12 so as to be collected at a predetermined position.

The light source bulb 12 may be e.g. a discharge bulb. The light source bulb 12 is held in a socket 15 which is attached to the rear end of the reflector 11.

The attaching frame 13 has a supported slot 13a at the upper end and a coupling concave 13b opened downward at the lower end. The attaching frame 13 has a shaft passing-through slot 13c formed immediately below the supported slot 13a, through which the coupling concave 13b passes.

The attaching frame 13 incorporates a bridging segment 13d bridged between both right and left sides, through which a relief slot 13e vertically passes.

The floodlighting lens 14 is attached to the attaching frame 13 so that its outer periphery is held by a retaining ring 16.

A supporting shaft 17 is attached to the tip of the upper supporting segment 8 of the bracket 6 so that it vertically passes through the upper supporting shaft 17. The supporting shaft 17 is rotationally movably inserted in the supported slot 13a of the attaching frame 13. Thus, the lamp unit 10 is supported by the bracket 6 so that it is horizontally rotatable through the supporting shaft 17. With the lamp unit 10 being supported by the bracket 6, the rear end of the lamp unit 10 is protruded rearward from the opening 7a of the bracket 6 (see FIG. 2).

To the lower end of the lamp body 2, as seen from FIG. 1, a cover 18 is attached. Inside the cover 18, a circuit unit 19 is arranged which is provided with a lighting circuit for lighting the light source bulb (discharge bulb) 12. The circuit unit 19 and socket 15 in which the light source bulb 12 is held are connected by a cord 15a. Therefore, a driving voltage created by the lighting circuit arranged in the circuit unit 19 is applied to the light source bulb 12 through the socket 15 so that the light source bulb 12 is lit.

Within the attaching frame 13, a shade 20 is rotationally movably supported (see FIGS. 2 and 3). The shade 20 has a function of limiting the upper edge of the pattern of light (distributed light pattern) emitted from the light source bulb 12.

The shade 20 is integrally composed of a light shielding segment 20a which is formed of a laterally lengthy plate, shaft passing-through segments 20b, 20b protruded forward from both right and left ends of the shielding segment 20a and supporting pieces 20c, 20c located inside the shaft passing-through segments 20b, 20b and protruded from the light shielding segment 20a.

A rotary moving fulcrum shaft 21 is passed through the shaft passing-through the segments 20b, 20b. Both ends of the rotary moving fulcrum shaft 21 are protruded outward from the shaft passing-through segments 20b, 20b. A twisting coil spring 22 is supported near the one end of the rotary moving fulcrum shaft 21. The shade 20 is urged by the twisting coil spring 22 in a direction in which the upper edge moves nearly forward (direction R1 indicated in FIG. 2).

Because both ends of the rotary moving fulcrum shaft 21 are attached to the inner walls on the right and left sides of the attaching frame 13, the shade 20 can be rotationally moved (inclinedly moved) around the rotary moving fulcrum shaft 21 for the lamp unit 10.

A coupling member 23 is supported by the supporting pieces 20c, 20c of the shade 20 (see FIG. 3). The coupling member 23 is composed of a base segment 23a which is formed of a wire-like material bent in a predetermined shape and extends laterally, a coupling segment 23b which is an arc formed centrally in the base segment 23a, arms 23c, 23c which are protruded from both ends of the base segment 23a in the same direction orthogonal thereto, and supported segments 23d, 23d which are protruded sideward so as to leave each other the arms 23c, 23c.

The coupling member 23 is supported in such a manner that the supported segments 23d, 23d are passed through the supporting pieces 20c, 20c of the shade 20, respectively. The shade 20 is made rotationally movable for the coupling member 23 around the supported segments 23d, 23d.

The light emitted from the light source bulb 12 and reflected from the reflecting surface 11a of the reflector 11 is collected in the vicinity of the upper edge of the shade 20. The focal point of the floodlighting lens 14 is located in the vicinity of the upper edge of the shade 20. Therefore, the beam (illumination light) with the upper edge of a distributed light pattern being limited by the upper edge of the shade 20 is projected forward by the floodlighting lens 14 as a lower beam or a upper beam.

An actuator 24 is arranged below the lamp unit 10 (see FIGS. 1 and 2). The actuator 24 is attached to the lower supporting segment 9 of the bracket 6. The actuator 24 is composed of a shade driving device 26 and a horizontally driving device 27 which are arranged within a single case 25.

The shade driving device 26 has a solenoid 28 serving as a driving source. The solenoid 28 incorporates a vertically long cylindrical core 29 and a driving shaft 30 attached to the core 29. The core 29 is made vertically movable for the solenoid 28. The solenoid 28 is provided on a circuit board 31 arranged within the case 25 and its upper end side portion is covered with a cylindrical protecting portion 32 from the outside.

The driving shaft 30 is protruded upward from the core 29 and passed through the shaft passing-through slot 13c formed in the attaching frame 13 of the lamp unit 10 so that its upper end is positioned within the lamp unit 10. The driving shaft 30 has a coupling shaft segment 30a with a smaller diameter than the other area. The coupling segment 23b of the coupling member 23 is fit over the coupling shaft segment 30a.

The arms 23c, 23c of the coupling member 23 are passed through the relief slot 13e formed in the bridging segment 13d of the attaching frame 13.

When the solenoid 28 is supplied with driving power from a power source unit not shown through the circuit board 31, the driving shaft 30 is moved upward. Owing to the upward movement of the driving shaft 20, the shade 20 coupled with the driving shaft 30 through the coupling member 23 is rotationally moved around the rotary-moving fulcrum shaft 21 so that it is inclined from the position where the light shielding segment 20a is upstanding (status indicated by virtual line in FIG. 2). Thus, at this time, the light emitted from the light source bulb 12 is projected as the upper beam from the floodlighting lens 14. When the shade 20 is rotationally moved around the rotary-moving fulcrum shaft 21, it is also rotationally moved for the supported segments 23d, 23d of the coupling member 23.

On the other hand, when supply of the driving power to the core 29 is stopped, the shade 20 is restored to its initial status owing to the urging force of the twisting coil spring 22 so that the light shielding segment 20a is placed in its nearly upstanding status (status indicated by solid line in FIG. 2). Thus, at this time, the light emitted from the light source bulb 12 is projected as the lower beam from the floodlighting lens 14.

The horizontally driving device 27 has a swivel DC motor 33 serving as a driving source arranged on the circuit board 31. The swivel DC motor 33 (see FIG. 2). The motor shaft 33a of the swivel DC motor 33 is protruded upward from a motor case 33b. A gear 34 is fixed to the area protruded from the motor case 33b of the motor shaft 33a.

Within the case 25, a plurality of reduction gears 35, 36, 37 in mesh with one another in order are arranged. The reduction gear 35 is in mesh with the gear 34 fixed to the motor shaft 33a, and the reduction gear 37 is in mesh with a gear body 38 (a driven member 38).

The gear body 38 is integrally composed of a vertically long coupling shaft segment 39 and a gear segment 40 overhanging sideward from the lower end of the coupling shaft segment 39. The coupling shaft segment 39 has a supported concave area 39a which opens downward. The coupling shaft segment 39 has a shaft through-hole 39b vertically passing through it. The shaft through-hole 39b communicates with the supported concave area 39a. The gear segment 40 is in mesh with the reduction gear 37.

The gear body 38 is made rotatable for the protecting portion 32 in a state where the protecting portion 32 covering the solenoid 28 is inserted in the supported concave area 39a. In this state, the driving shaft 30 is passed through the shaft through-hole 39b of the coupling shaft segment 39 to protrude upward. The gear body 38 is rotated around the driving shaft 30.

A part of the coupling shaft segment 39 is protruded upward from the case 25 and the protruded portion is fit in the coupling concave 13b of the attaching frame 13. As a result, the gear body 38 is coupled with the lamp unit 10 in a state where they are fixed to each other. Thus, when the gear body 38 is rotated, the lamp unit 10 is rotationally moved all together. With the rotational movement of the lamp unit 10, the shade 20 is also rotationally moved all together. At this time, the coupling member 23 is rotationally moved for the driving shaft 30 around the coupling segment 23b. Otherwise, the driving shaft 30 and core 29 are rotationally moved for the solenoid 28.

For example, when the swivel DC motor 33 is rotated in either any one direction according to a steering operation, the driving force of the swivel DC motor 33 is transmitted to the gear body 38 through the gear 34 and the reduction gears 35, 36, 37. The gear body 38 is rotated right or left according to the rotating direction of the swivel DC motor 33. By the rotation of the gear body 38, the lamp unit 10 is rotationally moved rightward or leftward around the driving shaft 30. As a result, the light projecting direction is changed rightward or leftward.

A connector 41 is attached to the front surface of the case 25 of the actuator 24. Through a connection cord 41a connected to the connector 41, electric power or a signal is externally supplied to the circuit board 31 arranged within the case 25.

Figure 4:
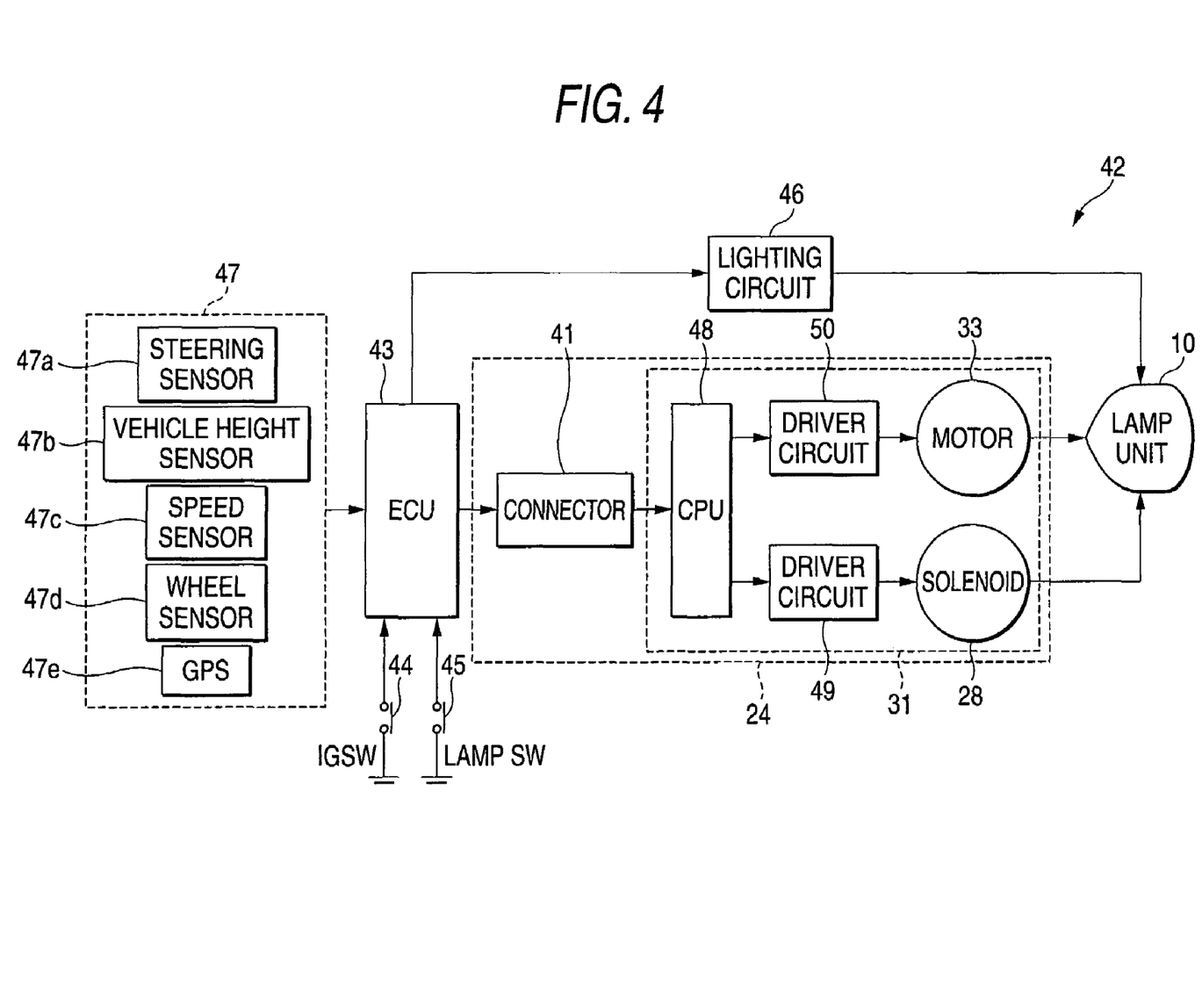
FIG. 4 is a block diagram of a constructional example of a control circuit of the vehicle lamp.

The vehicle lamp 1 is provided with a control circuit 42 for controlling the light projecting direction using the actuator 24 (see FIG. 4).

The control circuit 42 is provided with an ECU (Electronic Control Unit) 43 for controlling the entire head lamp system inclusive of the vehicle lamp 1. An ignition switch 44 and a lamp switch 45 are connected to the ECU 43. With the ignition switch 44 turned ON, when the lamp switch 45 is turned ON, a lighting signal is sent from the ECU 43 to the lighting circuit 46. By the lighting circuit 46, the light source bulb 12 is lit to project the beam having a predetermined distributed light pattern.

The ECU 43 is supplied with signals from various sensors 47, e.g. a steering sensor 47a, a vehicle height sensor 47b, a vehicle speed sensor 47c, a wheel sensor 47d and a GPS (Global Positioning System) sensor 47e. The steering sensor 47a provides the information signal relative to a steering direction and a steering angle when the steering operation is done. The vehicle height sensor 47b provides the information signal relative to the heights of a front and a rear wheel. The vehicle speed sensor 47c provides the information signal relative to the vehicle speed. The wheel sensor 47d provides the information signal relative to the revolving speed of each wheel. The GPS sensor 47e provides the information signal relative to the present position of the vehicle based on the global positioning system. On the basis of the information signals supplied from the respective sensors 47, the ECU 43 transmits a predetermined control signal to the actuator 24 so that the beam emitted from the light source bulb 12 is projected in an optimum light projecting direction. The actuator 24 receives the control signal supplied from the ECU 43 through the single connector 41.

On the circuit board 31 located within the case 25 of the actuator 24, a CPU (central processing unit) 48 incorporating a control program is mounted. The ECU 43 supplies a predetermined control signal to the CPU 48 through the connector 41. On the basis of the control signal received from the ECU 43, the CPU 48 supplies a predetermined signal to each of driver circuits 49, 50 formed on the circuit board 31 so that the swivel DC motor 33 and solenoid 28 are individually driven by the driver circuits 49, 50.

As described above, in the vehicle lamp 1, power supply and transmission of the control signal to the shade driving device 26 and the horizontally driving device 27 are executed through the single connector 41. For this reason, reduction in the number of components and simplifying of the wirings arranged within the lamp room 5 can be realized.

Particularly, as described above, if the connector 41 is located at the front end of the case 25, the connection cord 41a connected to the connector 41 does not positionally interfere with the cord 15a connected to the light source bulb 12 and located at the rear side of the lamp room 5.

Since both the circuits for controlling the shade driving device 26 and the horizontally driving device 27 are provided on the single circuit board 31, the actuator 24 can be downsized and the number of components can be reduced by commonizing the power source circuits and control components of the shade driving device 26 and horizontally driving device 27.

Further, since the swivel DC motor 33 and the solenoid 28 are arranged within the single case 25, the control for the swivel DC motor 33 and the solenoid 28 can be done by the single CPU 48 provided in the actuator 24.

As described above, in the vehicle lamp 1, the shade driving device 26 is provided with the driving shaft 30 connected to the shade 20 and the lamp unit 10 is rotationally moved around the driving shaft 30 by the horizontally driving device 27. For this reason, by the driving shaft 30, agreement in output positions is made between the shade driving device 26 relative to the shade 20 and the horizontally driving device 27 relative to the lamp unit 10.

Thus, when the lamp unit 10 is rotationally moved horizontally by the horizontally driving device 27, the shade driving device 26 is not rotationally moved integrally to the lamp unit 10. Therefore, the object to be driven inclusive of the lamp unit 10 horizontally driven by the swivel DC motor 33 is not heavy, thereby reducing the torque of the swivel DC motor 33, and realizing downsizing thereof and a decrease in power consumption.

Further, since the shade driving device 26 and the horizontally driving device 27 are integrated to constitute the single actuator 24, simplifying of the mechanism attached to the vehicle lamp 1 and of the process of assembling the respective components in the vehicle lamp 1 can be realized.

Further, since the connection cord 41a connected to the actuator 25 is not located within the lamp unit 10, the space for arranging the connection cord 41a within the lamp unit 10 is not required. In addition, no consideration is required for training the connecting cord 41a within the lamp unit 10. Correspondingly, the vehicle lamp 1 can downsized and reduced in production cost.

Furthermore, in horizontally driving the lamp unit 10, the connection cord 41a is not flexed with the rotational movement of the lamp unit 10. Thus, load is not applied to the swivel DC motor 33 through the connection cord 41a. Correspondingly, the torque of the swivel DC motor 33 can be reduced.

Additionally, in the vehicle lamp 1, since the horizontally driving device 27 and the shade driving mans 26 are arranged within the single case 25, the vehicle lamp 1 can be downsized and saved in space.

As described above, since the solenoid 28 is used as the driving source for the shade driving device 26, the shade 20 can be operated by the axial movement of the driving shaft 30. Thus, the structure of the shade driving device 26 can be simplified.

Further, where the solenoid 28 is used as the driving source for the shade driving device 26, the "duty control" can be done. Specifically, it is known that the suction force for the core of the solenoid increases abruptly with a decrease in the core stroke. So the holding force for the core of the solenoid is likely to increase excessively. Thus, by increasing the supplied quantity of the actuating current to the solenoid 28 only in starting the operation and reducing the supplied quantity of the current to the solenoid 28 when it is holding the core 29, power consumption can be reduced.

Incidentally, in the example described above, the shade 20 was urged in the predetermined rotary moving direction using the twisting coil spring 22 supported by the rotary moving fulcrum shaft 21. However, the device for urging the shade 20 should not be limited to the twisting coil spring 22. For example, in place of the twisting coil spring 22, the coil spring for downward urging the driving shaft 30 may be arranged on the solenoid 28 side so that the shade 20 is urged through the driving shaft 30.

In the example described above, the driving shaft 30 and the shade 20 were coupled with each other by the coupling member 23. However, the driving shaft 30 and the shade 20 can be coupled by the following configuration.

Figure 5:
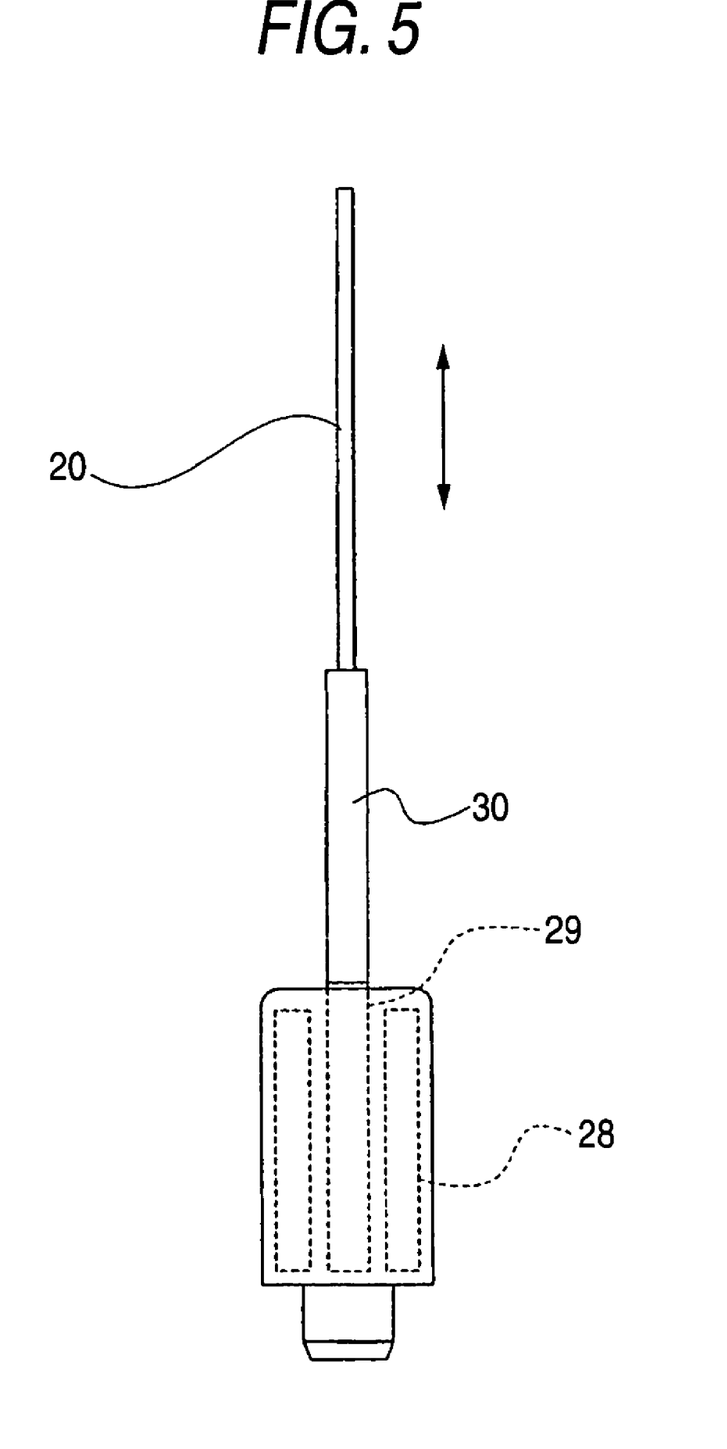
FIG. 5 is a side view of a coupled state between a driving shaft and a shade according to a modification of the first exemplary embodiment.

For example, as seen from FIG. 5, there is a configuration in which the lower end of the shade 20 is directly coupled with the upper end of the driving shaft 30. In this case, the shade 20 is moved vertically with the vertical movement of the driving shaft 30. When the shade 20 is positioned at the upward moving end, the light emitted from the light source bulb 12 is projected as the lower beam from the floodlighting lens 14. When the shade 20 is positioned at the downward moving end, the light emitted from the light source bulb 12 is projected as the upper beam from the floodlighting lens 14.

By adopting the configuration as shown in FIG. 5 as the configuration for coupling the driving shaft 30 and the shade 20, reduction in the number of components and simplifying of the mechanism can be realized.

Figure 6:
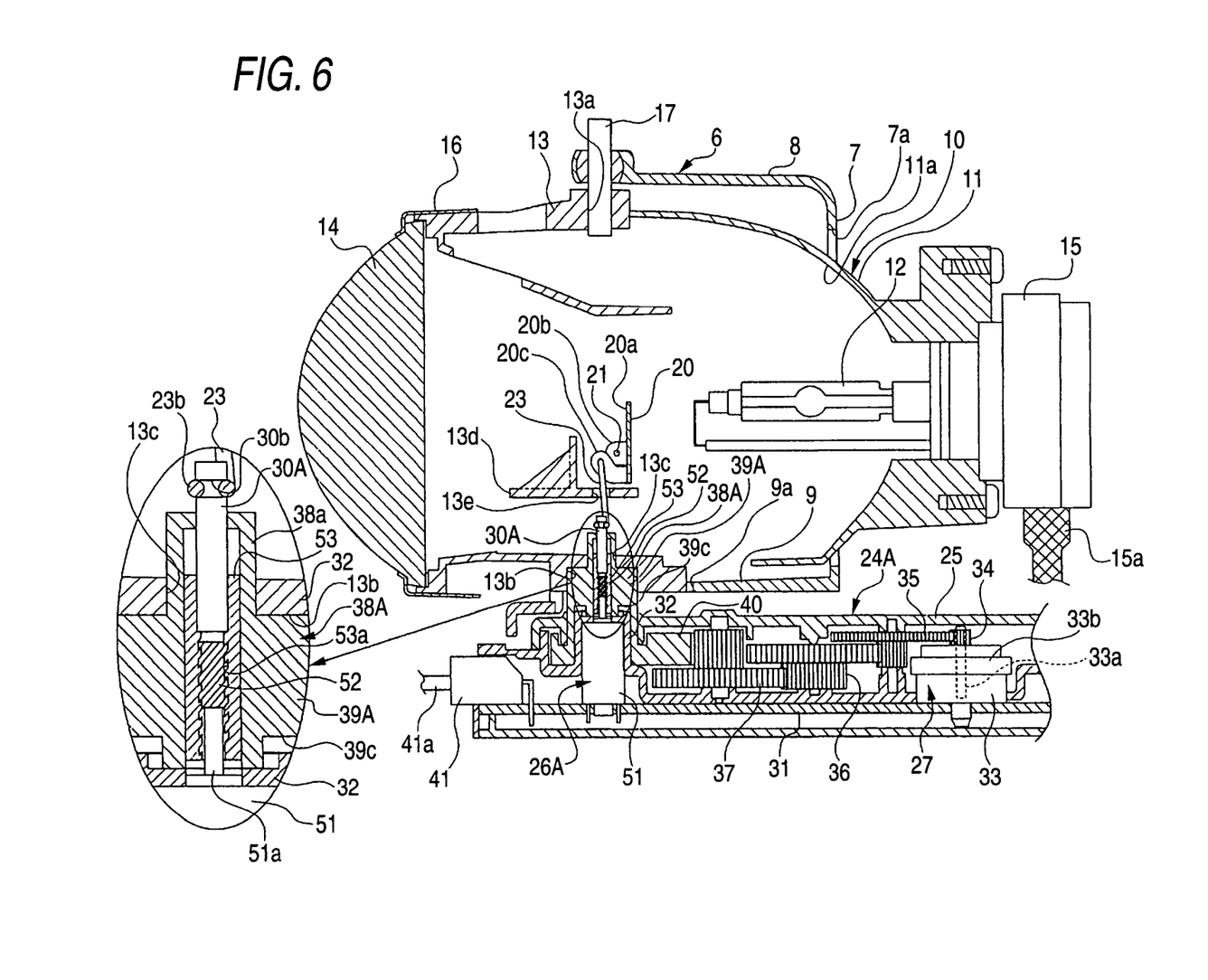
FIG. 6 is an enlarged longitudinal sectional view of a vehicle lamp according to a second exemplary embodiment of the present invention.

Next, an explanation will be given of a second exemplary embodiment of the invention in which the vehicle lamp according to the present invention is applied to a vehicle headlamp (see FIG. 6).

Incidentally, the vehicle lamp according to the second exemplary embodiment described below is different from the vehicle lamp 1 of the first exemplary embodiment in only the configuration of the shade driving device. So only the different configuration from the vehicle lamp 1 will be explained in detail, and the remaining configuration with the same reference symbols as those in the vehicle lamp 1 will not be explained.

An actuator 24A is arranged below the lamp unit 10 of the vehicle lamp according to the second exemplary embodiment of the invention. The actuator 24A is attached to the lower surface of the lower supporting segment 9 of the bracket 6. The actuator 24A is composed of a shade driving device 26A and a horizontally driving device 27 which are arranged within the single case 25.

The shade driving device 26A has a shade DC motor 51 serving as the driving source. A multiple-thread screw 52 is secured to the motor shaft 51a of the shade DC motor 51. By using the multiple-thread screw 52, the leading angle of a screw groove is increased as compared with the case using a single-thread screw. The shade DC motor 51 is placed on the circuit board 31 arranged within the case 25 and its upper end side portion is covered with the protecting portion 32 from the outside. The protecting portion 32 is inserted in a supported concave 39c formed in a coupling shaft segment 39A of a gear body 38A so that the gear body 38A is rotatable for the protecting portion 32.

The gear body 38A has a cylindrical segment 38a where the motor shaft 51 a and the multiple-thread screw 52 are arranged. Within the cylindrical segment 38a, a cylindrical nut member 53 is supported. On the lower half of the inner wall of the nut member 53, a screw-groove segment 53a is formed. The screw-groove segment 53a is screw-engaged with the multiple-thread screw 52.

The nut member 53 is made vertically slidably movable for the cylindrical segment 38a and also non-rotatable around the shaft. Thus, when the multiple-thread screw 52 is rotated with the rotation of the shade DC motor 51, the nut member 53 is fed so that it is moved vertically according to the rotating direction of the shade DC motor 51.

A driving shaft 30A is secured to the upper end of the nut member 53. The driving shaft 30A is protruded upward from the nut member 53 and further protruded upward from the cylindrical segment 38a. Its upper end is positioned within the lamp unit 10. The driving shaft 30A has a coupling shaft segment 30b with a smaller diameter than the other area. The coupling segment 23b of the coupling member 23 is attached to the coupling shaft segment 30b.

When the shade DC motor 51 is supplied with driving power from a power source unit not shown through the circuit board 31, the multiple-thread screw 52 is rotated. Thus, the nut member 53 and the driving shaft 30A are integrally moved vertically according to the rotating direction of the shade DC motor 51.

When the driving shaft 30A is moved upward, the shade 20 is rotationally moved to incline. At this time, the light emitted from the light source bulb 12 is projected as the upper beam by the floodlighting lens 14.

On the other hand, when the driving shaft 30A is moved downward, the inclined shade 20 is rotationally moved so that it is nearly upstanding. At this time, the light emitted from the light source bulb 12 is projected as the lower beam by the floodlighting lens 14.

In the above configuration using the shade DC motor 51 and multiple-thread screw 52, in order that in failure, the shade 20 automatically returns to a predetermined position, the shade 20 is urged in a predetermined rotating direction by the device such as the twisting coil spring. In this case, usually the DC motor has cogging torque and so is required to have urging force (spring force) enough to overcome this torque. By adopting the device capable of reducing the cogging torque, the urging force of the device such as the twisting coil spring can be minimized.

Further, in the second exemplary embodiment of the present invention using the shade DC motor 51 and multiple-thread screw 52, like the first exemplary embodiment thereof, in keeping the positions of the respective components during the operation, the "duty control" can be done in order to restrict the heating value and reduce the power consumption.

The second exemplary embodiment of the present invention also provides the same meritorious effect as the vehicle lamp 1 according to the first exemplary embodiment.

Further, since the shade DC motor 51 is employed as the driving source for the shade driving device 26, the large output can be obtained with small power, thereby saving electric power. In addition, by downsizing the shade DC motor 51, the actuator 24A can be downsized.

In the examples described above, by the shade driving device 26, 26A, the beam was switched between the lower beam and the upper beam. However, the beam switching should not be limited between the lower beam and the upper beam, but may be done in the other mode such as high speed running distributed light (motor way distributed light) in which the shielded quantity of light is slightly reduced by the shade 20 with the cut-line of the beam being raised by about 0.34°.

Any shape and structure of the respective components identified in the exemplary embodiments of the present invention are only exemplary in the embodiment in carrying out the present invention. Owing to this, the technical scope of the present invention should not be limitedly construed.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A vehicle lamp comprising:
   a lamp unit supported in a lamp housing and rotationally movable in a horizontal direction, the lamp unit having a light source;
   a shade movable so as to change a shielded quantity of light emitted from the light source;
   a horizontally driving device for rotationally actuating the lamp unit in the horizontal direction;
   a shade driving device for actuating the shade; and
   a driving shaft provided on the shade driving device and coupled with the shade,
   wherein the lamp unit is rotationally moved by the horizontally driving device around the driving shaft, and
   wherein the driving shaft extends along a rotational center of the lamp unit.

2. The vehicle lamp according to claim 1, wherein the shade is movably supported to the lamp unit.

3. The vehicle lamp according to claim 1, wherein the horizontally driving device and the shade driving device are provided within a single case.

4. The vehicle lamp according to claim 3, wherein power and control signals to the shade driving device and the horizontally driving device are supplied and transmitted through a single connector.

5. The vehicle lamp according to claim 3, wherein both circuits for controlling the shade driving device and the horizontally driving device are provided on a single circuit board.

6. The vehicle lamp according to claim 1, wherein the driving shaft is axially moved so as to actuate the shade.

7. The vehicle lamp according to claim 6, wherein the horizontally driving device comprises a motor and a driven member driven by the motor and integrally rotatable with the lamp unit,
   the driven member is provided with a through-hole at a center of rotation of the driven member, and
   the driving shaft passed through the through-hole.

8. The vehicle lamp according to claim 7, wherein the shade driving device comprises a solenoid to actuate the driving shaft.

9. The vehicle lamp according to claim 7, wherein the shade driving device comprises a motor, a screw and a nut member,
   when the motor rotates, the screw and the nut are relatively rotatable so as to actuate the driving shaft.

10. The vehicle lamp according to claim 6, wherein a DC motor is used as a driving source of the shade driving device, and
    a rotation of a motor shaft of the DC motor is converted into an axial movement of the driving shaft so as to actuate the shade.

* * * * *